US007610194B2

(12) United States Patent  (10) Patent No.: US 7,610,194 B2
Bradford et al.  (45) Date of Patent: Oct. 27, 2009

(54) DYNAMIC DATABASE REORDERING SYSTEM

(75) Inventors: Ethan R. Bradford, Seattle, WA (US); David Jon Kay, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 812 days.

(21) Appl. No.: 10/621,864

(22) Filed: Jul. 16, 2003

(65) Prior Publication Data

US 2004/0083198 A1  Apr. 29, 2004

Related U.S. Application Data

(60) Provisional application No. 60/397,253, filed on Jul. 18, 2002.

(51) Int. Cl.
G06F 17/21 (2006.01)
(52) U.S. Cl. .................. 704/10; 704/1; 704/9; 707/1; 707/3; 707/4; 707/6; 715/256; 715/259; 715/261; 341/21; 341/22; 345/173; 382/181; 382/188; 379/368
(58) Field of Classification Search .............. 704/1, 704/9, 10; 715/534, 261, 256, 259; 711/136; 707/1–6; 341/21, 22; 345/173; 382/181, 382/188; 379/368
See application file for complete search history.

(56) References Cited

U.S. PATENT DOCUMENTS 3,980,869 A  9/1976  Lombardino et al.

(Continued)

FOREIGN PATENT DOCUMENTS

CN  1116335 A  2/1996

(Continued)

OTHER PUBLICATIONS

Arnott, J.L., et al; *Probabilistic Character Disambiguation for Reduced Keyboards Using Small Text Samples*; Dept. Math & Comp. Sci.; Univ of Dundee, Dundee, Tayside, Scotland; AAC Augmentative and Alternative Communication; vol. 8, Sep. 1992; Copright 1992 by ISAAC.

(Continued)

*Primary Examiner*—David R Hudspeth
*Assistant Examiner*—Lamont M Spooner
(74) *Attorney, Agent, or Firm*—Michael A. Glenn; Gleen Patent Group

(57) ABSTRACT

A dynamic database reordering system provides a linguistics database that contains words that are ordered according to a linguistics model that dictates the order in which words are presented to a user. While a user enters keystrokes on a keypad of a communications device is pressing keys, the invention predicts the words, letters, numbers, or word stubs that the user is trying to enter. The invention reorders the linguistics model order based on the user's usage of the system by tracking the user's word selections. Once a word has been selected as a result of a next key selection (the nexted word), a frequency value is applied to the selected word and the word ordered first by the linguistics model in the linguistics database for that key sequence. The frequency value of the nexted word will become greater than the frequency value of the first displayed word upon repeated nexting to the same word. Subsequent user entries of the key sequence for the nexted word and the first ordered word will result in displaying the nexted word before the word ordered first by the linguistics model.

29 Claims, 5 Drawing Sheets

U.S. PATENT DOCUMENTS

| | | | |
|---|---|---|---|
| 4,286,329 A | 8/1981 | Goertzel et al. | |
| 4,365,235 A | 12/1982 | Greanias et al. | |
| 4,439,649 A | 3/1984 | Cecchi | |
| 4,454,592 A | 6/1984 | Cason et al. | |
| 4,559,598 A | 12/1985 | Goldwasser et al. | |
| 4,561,105 A | 12/1985 | Crane et al. | |
| 4,573,196 A | 2/1986 | Crane et al. | |
| 4,689,768 A | 8/1987 | Heard et al. | |
| 4,725,694 A | 2/1988 | Auer et al. | |
| 4,782,464 A | 11/1988 | Gray et al. | |
| 4,783,758 A | 11/1988 | Kucera | |
| 4,783,761 A | 11/1988 | Gray et al. | |
| 4,891,777 A | 1/1990 | Lapeyre | |
| 4,891,786 A | 1/1990 | Goldwasser | |
| 5,109,352 A | 4/1992 | O'Dell | |
| 5,127,055 A | 6/1992 | Larkey | |
| 5,187,480 A | 2/1993 | Thomas et al. | |
| 5,224,179 A | 6/1993 | Denker et al. | |
| 5,305,205 A * | 4/1994 | Weber et al. | 715/531 |
| 5,317,507 A | 5/1994 | Gallant | |
| 5,457,454 A | 10/1995 | Sugano | |
| 5,462,711 A | 10/1995 | Ricottone | |
| 5,533,147 A | 7/1996 | Arai et al. | |
| 5,561,446 A | 10/1996 | Montlick | |
| 5,574,482 A | 11/1996 | Niemeier | |
| 5,583,946 A | 12/1996 | Gourdol | |
| 5,586,198 A | 12/1996 | Lakritz | |
| 5,612,690 A | 3/1997 | Levy | |
| 5,649,223 A | 7/1997 | Freeman | |
| 5,664,896 A | 9/1997 | Blumberg | |
| 5,734,750 A | 3/1998 | Arai et al. | |
| 5,745,719 A | 4/1998 | Falcon | |
| 5,748,512 A | 5/1998 | Vargas | |
| 5,754,686 A | 5/1998 | Harada et al. | |
| 5,784,008 A | 7/1998 | Raguseo | |
| 5,796,867 A | 8/1998 | Chen et al. | |
| 5,798,760 A | 8/1998 | Vayda et al. | |
| 5,805,911 A * | 9/1998 | Miller | 715/534 |
| 5,812,696 A | 9/1998 | Arai et al. | |
| 5,812,697 A | 9/1998 | Sakai et al. | |
| 5,818,437 A | 10/1998 | Grover et al. | |
| 5,870,492 A | 2/1999 | Shimizu et al. | |
| 5,896,321 A | 4/1999 | Miller et al. | |
| 5,917,476 A | 6/1999 | Czerniecki | |
| 5,923,793 A | 7/1999 | Ikebata | |
| 5,926,566 A | 7/1999 | Wang et al. | |
| 5,933,526 A | 8/1999 | Sklarew | |
| 5,952,942 A | 9/1999 | Balakrishnan et al. | |
| 5,953,541 A | 9/1999 | King et al. | |
| 5,956,021 A | 9/1999 | Kubota et al. | |
| 5,963,671 A | 10/1999 | Comerford et al. | |
| 5,973,676 A | 10/1999 | Kawakura | |
| 6,002,390 A | 12/1999 | Masui | |
| 6,002,799 A | 12/1999 | Sklarew | |
| 6,009,444 A | 12/1999 | Chen | |
| 6,011,554 A | 1/2000 | King et al. | |
| 6,028,959 A | 2/2000 | Wang et al. | |
| 6,041,137 A | 3/2000 | Van Kleeck | |
| 6,044,165 A | 3/2000 | Perona et al. | |
| 6,054,941 A | 4/2000 | Chen | |
| 6,075,469 A | 6/2000 | Pong | |
| 6,094,197 A | 7/2000 | Buxton et al. | |
| 6,104,317 A | 8/2000 | Panagrossi | |
| 6,104,384 A | 8/2000 | Moon et al. | |
| 6,130,962 A | 10/2000 | Sakurai | |
| 6,144,764 A | 11/2000 | Yamakawa et al. | |
| 6,148,104 A | 11/2000 | Wang et al. | |
| 6,157,379 A | 12/2000 | Singh | |
| 6,169,538 B1 | 1/2001 | Nowlan et al. | |
| 6,172,625 B1 | 1/2001 | Jin et al. | |
| 6,204,848 B1 | 3/2001 | Nowlan et al. | |
| 6,212,297 B1 | 4/2001 | Sklarew | |
| 6,275,611 B1 | 8/2001 | Parthasarathy | |
| 6,278,445 B1 | 8/2001 | Tanaka et al. | |
| 6,286,064 B1 | 9/2001 | King et al. | |
| 6,307,549 B1 * | 10/2001 | King et al. | 715/810 |
| 6,314,418 B1 * | 11/2001 | Namba | 707/2 |
| 6,320,943 B1 * | 11/2001 | Borland | 379/112.01 |
| 6,362,752 B1 | 3/2002 | Guo et al. | |
| 6,392,640 B1 | 5/2002 | Will | |
| 6,424,743 B1 | 7/2002 | Ebrahimi | |
| 6,437,709 B1 | 8/2002 | Hao | |
| 6,448,987 B1 | 9/2002 | Easty et al. | |
| 6,453,079 B1 | 9/2002 | McInerny | |
| 6,489,951 B1 | 12/2002 | Wong et al. | |
| 6,493,464 B1 | 12/2002 | Hawkins et al. | |
| 6,502,118 B1 | 12/2002 | Chatterjee | |
| 6,542,170 B1 | 4/2003 | Williams et al. | |
| 6,549,219 B2 | 4/2003 | Selker | |
| 6,567,072 B2 | 5/2003 | Watanabe | |
| 6,585,162 B2 | 7/2003 | Sandbach et al. | |
| 6,616,703 B1 | 9/2003 | Nakagawa | |
| 6,654,733 B1 | 11/2003 | Goodman et al. | |
| 6,686,852 B1 | 2/2004 | Guo | |
| 6,686,907 B2 | 2/2004 | Su et al. | |
| 6,711,290 B2 | 3/2004 | Sparr et al. | |
| 6,757,544 B2 | 6/2004 | Rangarjan et al. | |
| 6,765,554 B2 | 7/2004 | Millington | |
| 6,801,659 B1 | 10/2004 | O'Dell | |
| 6,807,529 B2 | 10/2004 | Johnson et al. | |
| 6,819,315 B2 | 11/2004 | Toepke et al. | |
| 6,820,075 B2 * | 11/2004 | Shanahan et al. | 707/3 |
| 6,829,607 B1 * | 12/2004 | Tafoya et al. | 707/6 |
| 6,864,809 B2 | 3/2005 | O'Dell et al. | |
| 6,912,581 B2 | 6/2005 | Johnson et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,970,599 B2 | 11/2005 | Longe et al. | |
| 6,973,332 B2 | 12/2005 | Mirkin et al. | |
| 6,982,658 B2 | 1/2006 | Guo | |
| 6,990,534 B2 | 1/2006 | Mikhailov et al. | |
| 7,020,270 B1 | 3/2006 | Ghassabian | |
| 7,020,849 B1 | 3/2006 | Chen | |
| 7,057,607 B2 | 6/2006 | Mayoraz et al. | |
| 7,075,520 B2 | 7/2006 | Williams | |
| 7,088,861 B2 | 8/2006 | Van Meurs | |
| 7,095,403 B2 | 8/2006 | Lyustin et al. | |
| 7,107,204 B1 | 9/2006 | Liu et al. | |
| 7,139,430 B2 | 11/2006 | Sparr et al. | |
| 7,149,550 B2 | 12/2006 | Kraft et al. | |
| 7,151,533 B2 | 12/2006 | Van Ieperen | |
| 7,155,683 B1 | 12/2006 | Williams | |
| 7,224,989 B2 | 5/2007 | Kraft | |
| 7,256,769 B2 | 8/2007 | Pun et al. | |
| 7,257,528 B1 | 8/2007 | Ritchie et al. | |
| 7,272,564 B2 | 9/2007 | Phillips et al. | |
| 7,313,277 B2 | 12/2007 | Morwing et al. | |
| 7,349,576 B2 | 3/2008 | Hotsberg | |
| 7,385,531 B2 | 6/2008 | Zhang | |
| 7,389,235 B2 | 6/2008 | Dvorak | |
| 7,437,001 B2 | 10/2008 | Morwing et al. | |
| 7,466,859 B2 | 12/2008 | Chang et al. | |
| 2001/0048425 A1 | 12/2001 | Partridge | |
| 2002/0093491 A1 | 7/2002 | Allen et al. | |
| 2002/0122072 A1 | 9/2002 | Selker | |
| 2002/0135499 A1 | 9/2002 | Guo | |
| 2002/0135561 A1 | 9/2002 | Rojewski | |
| 2002/0145587 A1 | 10/2002 | Watanabe | |
| 2002/0163544 A1 | 11/2002 | Baker et al. | |
| 2002/0168107 A1 | 11/2002 | Tang et al. | |
| 2003/0006956 A1 | 1/2003 | Wu et al. | |
| 2003/0023426 A1 | 1/2003 | Pun et al. | |
| 2003/0048257 A1 | 3/2003 | Mattila | |

| | | | |
|---|---|---|---|
| 2003/0054830 A1 | 3/2003 | Williams et al. | |
| 2003/0144830 A1 | 7/2003 | Williams | |
| 2003/0179930 A1 | 9/2003 | O'Dell et al. | |
| 2003/0184451 A1 | 10/2003 | Li | |
| 2004/0153963 A1 | 8/2004 | Simpson et al. | |
| 2004/0153975 A1 | 8/2004 | Williams et al. | |
| 2004/0163032 A1 | 8/2004 | Guo et al. | |
| 2004/0243389 A1 | 12/2004 | Thomas et al. | |
| 2005/0060138 A1 | 3/2005 | Wang et al. | |
| 2005/0114770 A1 | 5/2005 | Sacher et al. | |
| 2005/0223308 A1* | 10/2005 | Gunn et al. | 715/500 |
| 2006/0062461 A1 | 3/2006 | Longe et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0190819 A1* | 8/2006 | Ostergaard et al. | 715/534 |
| 2006/0193519 A1 | 8/2006 | Sternby | |
| 2006/0236239 A1 | 10/2006 | Simpson et al. | |
| 2006/0239560 A1 | 10/2006 | Sternby | |
| 2006/0247915 A1 | 11/2006 | Bradford et al. | |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 | 11/1983 |
| EP | 0739521 | 5/1996 |
| EP | 0762265 | 3/1997 |
| EP | 0858023 | 8/1998 |
| EP | 0961208 | 12/1999 |
| EP | 1018679 | 12/1999 |
| EP | 1085401 | 3/2001 |
| EP | 1168780 | 1/2002 |
| EP | 1355225 | 10/2003 |
| FR | 2824979 | 11/2002 |
| JP | 57010832 | 1/1982 |
| JP | 62065136 | 3/1987 |
| JP | 1023021 | 1/1989 |
| JP | 1047565 | 2/1989 |
| JP | 1993081482 | 4/1993 |
| JP | 1994083816 | 3/1994 |
| JP | 7094376 | 4/1995 |
| JP | 1995-146918 | 6/1995 |
| JP | 1996-305701 | 11/1996 |
| JP | 8319721 | 12/1996 |
| JP | 10135399 | 5/1998 |
| JP | 10-275046 | 10/1998 |
| JP | 11021274 | 1/1999 |
| JP | 11028406 | 2/1999 |
| JP | 1999336858 | 12/1999 |
| JP | 2001043205 | 2/2001 |
| JP | 2001282778 | 10/2001 |
| JP | A 2003-500771 | 1/2003 |
| KR | 2001-0107388 | 5/2000 |
| KR | 20020004419 | 1/2002 |
| TW | 498264 B | 8/2002 |
| WO | WO9816889 | 9/1997 |
| WO | WO 99/15952 | 4/1999 |
| WO | WO0072300 | 11/2000 |
| WO | WO 0074240 | 12/2000 |
| WO | WO03021788 | 3/2003 |
| WO | WO 2004/111812 | 12/2004 |
| WO | WO 2004/111871 | 12/2004 |
| WO | WO2004/111812 | 3/2006 |
| WO | WO 2006/026908 | 3/2006 |

OTHER PUBLICATIONS

Amin, A., et al., "Recognition of Hand-printed Chinese Characters Using Decision Trees/Machine Learning of C4.5 System," 1998, Pattern Analysis and Applications, pp. 130-141, Vol. 1, Issue 2.

Chen, Ju-Wei, et al., "A Hierarchical Representation for the Reference Database of On-Line Chinese Character Recognition," Aug. 20-23, 1996, INSPEC Abstract No. C9702-1250B-021.

Cheng, Rei-Heng, et al., "Recognition of Radicals in Handwritten Chinese Characters By Means of Problem Reduction and Knowledge Guidance," Sep. 1996, International Journal of Pattern Recognition and Artificial Intelligence, INSPEC Abstract No. C9706-5260B-280.

Chou, Kuo-Sen, et al., "Radical-Based Neighboring Segment Matching for On-Line Chinese Character Recognition," Aug. 25-26, 1996, Proceedings of the 13$^{th}$ International Conference on Pattern Recognition; INSPEC Abstract No. B9701-6140C-682, C9701-1250B-019.

Chou, Kuo-Sen, et al., "Radical-Based Neighboring Segment Matching for On-Line Chinese Character Recognition"; Apr. 1997, Computer Processing of Oriental Languages, INSPEC Abstract No. B9701-6140C-682, C9701-1250B-019.

Connell, S., et al., "Template-based Online Character Recognition"; Aug. 10, 1999; Department of Computer Science and Engineering, Michigan State University, East Lansing, Michigan.

Fan, Fang, et al., "An On-Line Handwritten Chinese Character Recognition System", Jan. 26-27 2000, Proceedings of the SPIE—The International Society for Optical Engineering, INSPEC Abstract No. C2000-12-5260B-085.

Hung, Kwok-Wah, et al., "Boxing Code for Stroke-Order Free Handprinted Chinese Characters Recognition"; Oct. 8-11 2000, Proceedings of IEEE International Conference on Systems, Man, Cybernetics, INSPEC Abstract No. C2001-01-5260B-087.

Kim, Ki-Cheol, et al., "On-Line Recognition of Stroke-Order Free Cursive Chinese Characters with Relaxation Matching", Mar. 1995; Journal of the Korea Information Science Society, INSPEC Abstract No. C9507-1250B-022.

Li, Xiaolin, et al., "On-Line Handwritten Alphanumeric Character Recognition Using Feature Sequences", 1995; Department of Computer Science, Hong Kong University of Science and Technology, Clear Water Bay, Kowloon, Hong Kong.

Lin, Chang-Keng, et al., "Stroke-Order Independent On-Line of Handwritten Chinese Characters"; Nov. 8-10, 1989, Proceedings of the SPIE—The International Society for Optical Engineering, INSPEC Abstract No. C90031813.

Liu, J.Z., et al., "Two-layer Assignment Method for Online Chinese Character Recognition", Feb. 2000, IEEE Proceedings-Vision, Image and Signal Processing, INSPEC Abstract No. C2000-06-1250B-004.

Liu, Jianzhuang, et al., "Stroke Order and Stroke Number Free On-Line Chinese Character Recognition Using Attributed Relational Graph Matching", Aug. 25-29, 1996 Proceedings of the 13$^{th}$ International Conference on Pattern Recognition, INSPEC Abstract No. C9701-1250B-035.

Naito, S., et al., "Rough Classification for Handprinted Chinese Characters by Stroke Density"; Aug. 1981; Transactions of the Institute of Electronics and Communication Engineers of Japan, INSPEC Abstract No. C82009693.

Nambu, H., et al., "On-Line Chinese Handwriting Character Recognition: Comparison with Japanese Kanji Recognition and Improvement of Input Efficiency", Aug. 1999; Transactions of the Information Processing Society of Japan, INSPEC Abstract No. B2000-01-6135E-035, C2000-01-5260B-099.

Odaka, K., et al., "Stroke Order Free On-Line Handwritten Character Recognition of Algorithm", Jun. 1982, Transactions of the Institute of Electronics and Communication Engineers of Japan, Section E, INSPEC Abstract No. C82041007.

Pan, Bao-Chang, et al., "Recognition of Handprinted Chinese Characters by Stroke Order Codes", Aug. 29-Sep. 1, 1988, International Conference on Computer Processing of Chinese and Oriental Languages, INSPEC Abstract No. C89024386.

Park, Hee-Seon, et al., "An On-line Recognition System for Cursive Chinese Characters with Effective Coarse Classification and Elastic Matching", Sep. 1993, Journal of the Korea Information Science Society, INSPEC Abstract No. C9404-1250B-001.

Romero, R., et al., "Optical Chinese Character Recognition using Probabilistic Neural Networks", Jul. 1996; Imaging Systems Lab, Robotics Institute, Carnegie Mellon University, Pittsburgh, PA, pp. 1-18.

Seni, G., et al., "Large Vocabulary Recognition of On-Line Handwritten Cursive Words", Jun. 1996; presented at IEEE Transactions on Pattern Analysis and Machine Intelligence.

Shin, J., "Online Handwriting Character Analysis Using Stroke Correspondence Search," Sep. 2001, Journal of Shanghai University, Aizu University, Fukushima, Japan, INSPEC Abstract No. C2001-11-1250B-012.

Srihari, S., et al., "Cherry Blossom: A System for Japanese Character Recognition," 1997; Center for Excellence for Document Analysis and Recognition, State University of New York at Buffalo, Buffalo, NY.

Stockton, R. et al., "JKanji: Wavelet-based Interactive Kanji Competition," Sep. 3-7 2000, Proceedings of the 15$^{th}$ International Conference on Pattern Recognition.

"Quick Stroke Information," Synaptics, retrieved on Nov. 18, 2006 from website: www.synaptics.com/products/quickstroke_faq.cfm and www.synaptics.com/products/quickstroke.cfm.

Vuurpijl, L. et al., "Coarse Writing-Style Clustering Based on Simple Stroke-Related Features," 1997; Institute for Cognition and Information, University of Nijmegen, Nijmegen, The Netherlands.

Zheng, Jing, et al., "Recognizing On-Line Handwritten Chinese Character Via FARG Matching," Aug. 18-20, 1997, Proceedings of the Fourth International Conference on Document Analysis and Recognition, INSPEC Abstract No. B9711-6140C-162, C971-5260B-123.

Shumin Zhai and Per-Ola Kristensson, *Shorthand Writing on Stylus Keyboard*, Apr. 5-10, 2003, CHI 3003, 5(1): 97-104, 2003.

Jennifer Mankoff and Gregory D. Abowd, *Error Correction Techniques for Handwriting, Speech and other Ambiguous or Error Prone Systems*, Jun. 1999; GVU TechReport, GIT-GVU-99-18.

Jennifer Mankoff and Gregory D. Abowd, *Cirrin: A Word-Level Unistroke Keyboard for Pen Input*, Nov. 1-4, 1998; Proceedings of UIST 1998, Technical note. pp. 213-214.

K. Perlin, *Quikwriting: Continuous Stylus-Based Text Entry*; Nov. 1-4, 1998 presented at ACM UIST'98 Conference, pp. 215-216.

M. Garrett, D. Ward, I. Murray, P. Cowans, and D. Mackay, *Implementation of Dasher, an Information Efficient Input Mechanism*; Jul. 11, 2003; presented at LINUX 2003 Conference, Edinburgh, Scotland.

P. Isokoski and R. Raisamo, *Device Independent Text Input: A Rationale and an Example*; May 23-26, 2000;Proceedings of the Working Conference on Advanced Visual Interfaces AVI2000, pp. 76-83, Palermo, Italy, 2000.

P. Isokoski, *Text Input Methods for Eye Trackers Using Off-Screen Targets*; Nov. 6-8, 2000; In Proceedings of *Eye Tracking Research & Applications Symposium 2000*, pp. 15-21. ACM, 2000.

P. Isokoski, *Model for Unistroke Writing Time*; Mar. 31-Apr. 5, 2001; CHI Letters: Human Factors in Computing Systems, SIGCHI 2001, 3(1):357-364, 2001.

P. Isokoski and M. Käki. *Comparison of Two Touchpad-Based Methods for Numeric Entry*; Apr. 20-25, 2002; CHI Letters: Human Factors in Computing Systems, CHI 2002, 4(1): 25-32, 2002.

P. Isokoski and I. Scott MacKenzie, *Text Entry on Mobile Systems: Directions for the Future*; Mar. 31-Apr. 5, 2001 ;CHI 2001 Extended Abstracts, p. 495.

P. Isokoski and I. S. MacKenzie; *Report on the CHI2001 Workshop on Text Entry on Mobile Systems*; Sep./Oct. 2001; SIGCHI Bulletin, p. 14.

P. Isokoski and I. S. MacKenzie. *Combined Model for Text Entry Rate Developmen*; Apr. 5-10, 2003; CHI2003 Extended Abstracts, pp. 752-753.

P. Isokoski and R. Raisamo, *Architecture for Personal Text Entry Methods*; 2003; In *Closing the Gap: Software Engineering and Human-Computer Interaction*, pp. 1-8. IFIP.

*Handbook for the Palm V™ Organizer*, 1998-1999; Palm Computing, Inc., Santa Clara, CA.

Masui, T.; "An Efficient Text Input method for Pen-based Computers"; Apr. 1998; Proceedings of the ACM Conf. on Human Factors in Computing Systems (CHI'98), ACM Press, pp. 328-335.

Masui, T.; "POBox: An Efficient Text Input Method for Handheld and Ubiquitous Computers"; Apr. 1998; Sony Computer Science Laboratories.

Pilot POBox (Jul. 1997); http://www.csl.sony.co.jp/person/maui/POBox/ilot.html; no translation provided.

POBox Example2: (Jul. 1997) http://www.csl.sony..co.jp/person/masui/POBox/example2.html; no translation provided.

Softava Q12 Mobile's Keypad; Printout dated Oct. 24, 2006; http://www.softava.com/q12.

* cited by examiner

DYNAMIC DATABASE REORDERING SYSTEM

CROSS REFERENCE TO RELATED APPLICATIONS

This application claims benefit of U.S. Provisional Patent Application Ser. No. 60/397,253, filed on 18 Jul. 2002.

BACKGROUND OF THE INVENTION

1. Technical Field

The invention relates to the ordering of elements extracted from a database. More particularly, the invention relates to the ordering of displayed elements from a database through the ranking of database elements that are actually selected by a user.

2. Description of the Prior Art

Technological advances have enabled manufacturers to create various small-format personal electronic devices. Some examples are Personal Data Assistants (PDA), Cellular Phones, small-form-factor data entry units, and other small-form-factor communication units.

As the size of these small electronic data devices decreased, the size of the data entry keyboards on the devices shrank. The solution to reducing the keyboard size was to decrease the number of keys on the keyboard. Reducing the number of keys has created several problems. The most obvious is the overloading of keys such as on a cellular phone. A single key may represent several characters. When text is input into a reduced keyboard device, it becomes tedious and difficult for the user to enter any reasonable amount of text. The overloaded keys typically require multiple presses to obtain the correct characters.

Keyboard disambiguating systems such as described in U.S. Pat. Nos. 5,818,437, 5,953,541, 6,011,554, and 6,286,064 owned by the Applicant solve the text entry problem by processing user keystrokes and forming and presenting words to the user that are associated with the keys pressed. Complete words are presented to the user that begin with the letters represented by the key presses. Presenting a list of words associated with the keys pressed saves the user from entering additional keystrokes to spell an entire word and also saves time. The user simply selects the first word in the list or scrolls down and selects the desired word.

The words that are presented to the user are stored in a vocabulary database. An example of a vocabulary database is described in U.S. Pat. Nos. 5,818,437, 5,953,541, 6,011,554, and 6,286,064 owned by the Applicant.

Another example is iTap by Motorola, Inc. of Schaumburg, Ill., which performs predictive keypad text entry on cellular phones. The iTap system also displays predicted words to the user. However, iTap does not order the displayed words to the user based on which words were actually used by the user. Such a feature would be extremely helpful to the user to save even more time and enable the user to enter text more quickly and efficiently.

It would be advantageous to provide a dynamic database reordering system that displays words associated with key presses to a user in an order based on the user's actual use of the words. It would further be advantageous to provide a dynamic database reordering system that does not store frequency of use information in the main database.

SUMMARY OF THE INVENTION

The invention provides a dynamic database reordering system. The invention displays words associated with key presses to a user in an order based on the user's actual use, if any, of the words. In addition, the invention does not store frequency of use information in the main database, thereby requiring minimal storage space.

A preferred embodiment of the invention provides a linguistics database that contains words that are ordered according to a linguistics model that dictates the order in which words are presented to a user. A user enters keystrokes on a keypad of a communications device. While the user is pressing keys, the invention predicts the words, letters, numbers, or word stubs that the user is trying to enter. Complete words are dynamically displayed to the user that begin with the letters represented by the key presses. The user typically presses a sequence of keys which is associated with more that one word in the database. In order to save space storing the linguistics database, the linguistics database is pre-ordered before placement into the product.

The invention provides for reordering of the linguistics model order based on the user's usage of the system. If more than one word shares the same key sequence, the most commonly used word is presented as a first choice in the displayed list. If the user does not want that word, but wants another word that is associated with the key sequence, then the user has the ability to scroll through the displayed list of words by pressing a next key, or scroll up or down keys. Once the user has found the desired word, the user activates a select key and the system enters the desired word into the user's text message at the insertion point.

A preferred embodiment of the invention tracks the user's word selections. Once a word has been selected as a result of a next key selection (the nexted word), a frequency value is applied to the selected word and the word ordered first by the linguistics model in the linguistics database for that key sequence.

The first time that a word is nexted by the user, the frequency value of the nexted word is typically lower than the frequency value of the first ordered word in the displayed list. The next time the nexted word is nexted to again, the frequency value of the nexted word is increased relative to the frequency value of the first ordered word. The frequency values are adjusted every time a word is selected.

Another embodiment of the invention looks at the position of the nexted word in the displayed list. If the nexted word is positioned after the second word in the displayed list, then the nexted word is promoted to the second word position. This increases the nexted word's frequency to the second word's frequency or a frequency above the second word's frequency, but below the first word's frequency.

The frequency value of the nexted word will become greater than the frequency value of the first displayed word upon nexting to the same word over and over again. Subsequent user entries of the key sequence for the nexted word and the first ordered word will result in displaying the nexted word before the word ordered first by the linguistics model.

In one embodiment of the invention, a word's frequency becomes greater than the first ordered word or another word with a higher frequency, when that word has been nexted to three (or a predetermined number) more times than the first ordered word.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a dynamic database reordering system. A system according to the invention displays words associated with key presses to a user in an order based on the user's actual use, if any, of the words. The invention additionally does not store frequency of use information in the main database, thereby requiring minimal storage space.

A preferred embodiment of the invention provides a method for displaying results retrieved from a linguistic database to a user that match the user's key presses on a keyboard. Any word selected by the user from the displayed results is assigned a frequency value that is determined by the user's word usage patterns. The frequency value is preferably not stored in the main linguistic database and only words that are actually used by the user are assigned a frequency. Some words that are used by the user that do not have the possibility of collisions with other words do not need to have a frequency assigned. The method reduces the amount of memory required to ½ of what would typically be needed to track a user's usage.

Figure 1:
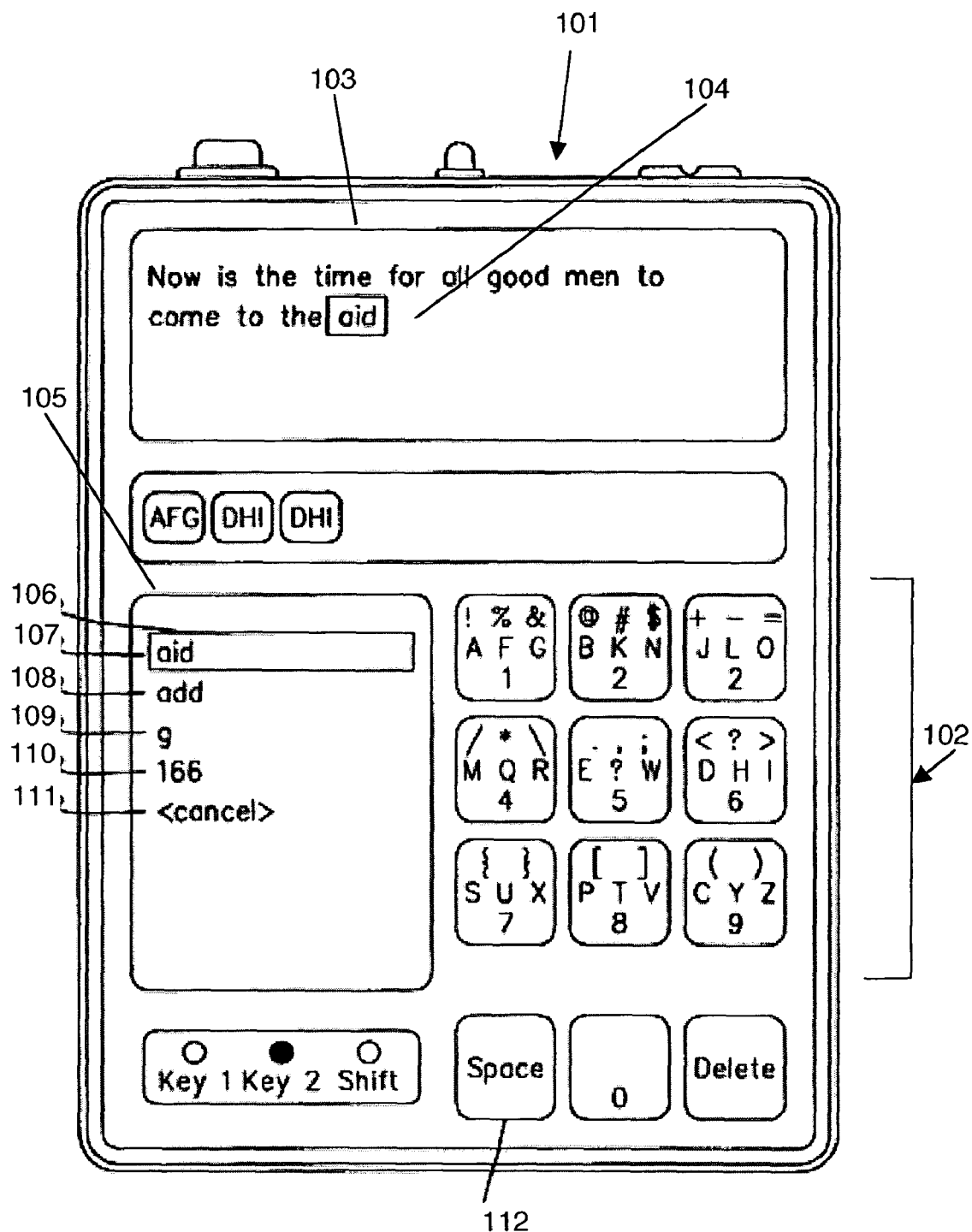
FIG. 1 is a diagram of a portable communication device with a reduced keyboard according to the invention.

Referring to FIG. 1, a personal communications device 101 with a reduced keyboard is shown. Keyboard disambiguating systems such as described in U.S. Pat. Nos. 5,818,437, 5,953, 541, 6,011,554, and 6,286,064 owned by the Applicant solve the text entry problem where input keys 102 are overloaded and a single key may represent several characters. User keystrokes on the keypad 102 are processed and displayed 103. While the user is pressing keys, the system predicts the words 106, 107, letters 108, numbers 109, or word stubs (not shown) that the user is trying to enter. Complete words are dynamically displayed 105 to the user that begin with the letters represented by the key presses.

Presenting a list of words associated with the keys pressed saves the user from entering additional keystrokes to spell an entire word and also saves time. The user selects the first word in the list or scrolls down the list and selects the desired word. In this example, the user can press the space key 112 to accept the first word in the list. The selected word appears in the user's text entry position 104. The user can also continue to press keys to further narrow or refine the selection of words displayed.

The words that are presented to the user are stored in a vocabulary database. If the words in the database are sorted by the frequency of use of each word, then the same words are always presented 105 to the user in the same order.

The invention's T9® linguistics database (LDB) contains words that are ordered according to a linguistics model that dictates the order in which words are presented to a user. The user typically presses a sequence of keys which is associated with more that one word in the database.

In order to save space storing the LDB, the LDB is pre-ordered before placement into the product. The words are ordered using a linguistics model that measures the commonality frequency value for each word in the database. The database is assembled using the frequency ordering. The frequency values are not stored with the words in the database once it is compiled, thereby requiring less space to store the LDB.

Figure 2:
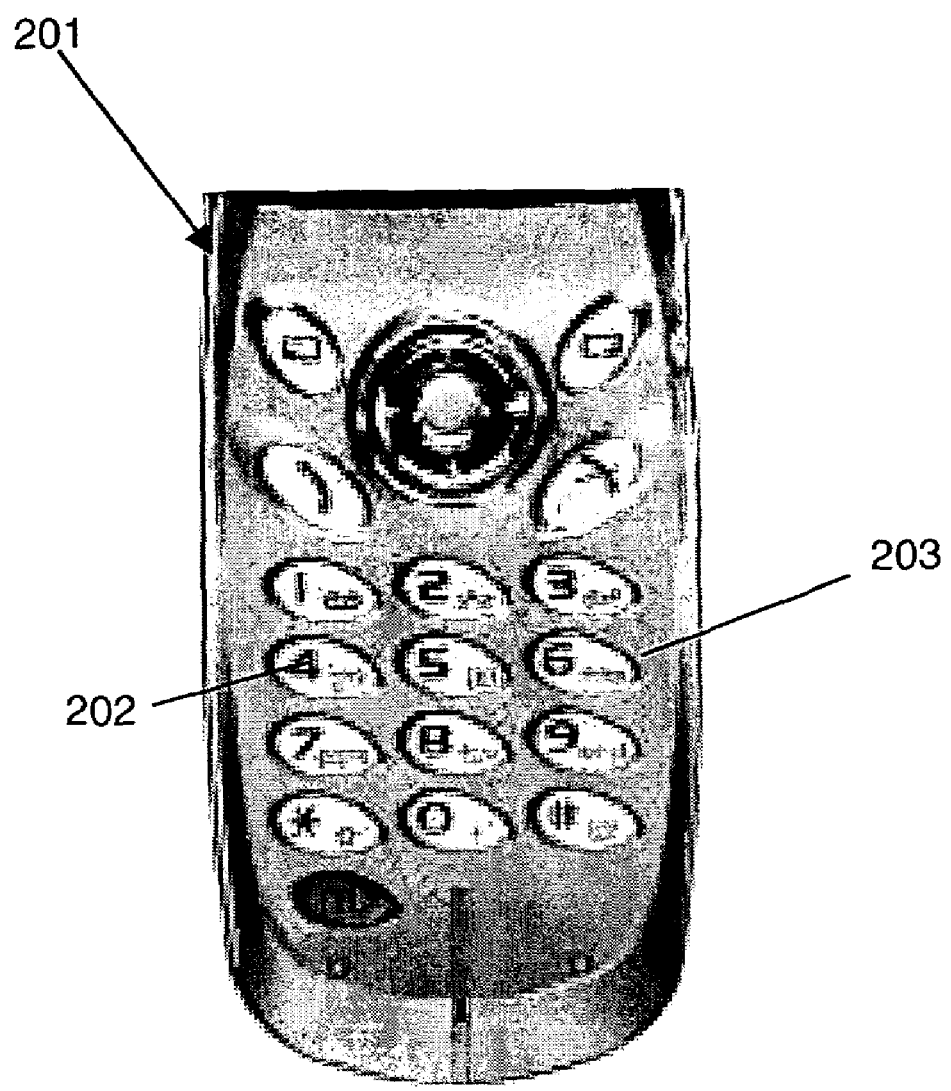
FIG. 2 is a diagram of a cellular phone keyboard according to the invention.

For example, FIG. 2 shows a typical cellular phone keyboard 201. If the linguistics model indicates that the word "in" has a higher frequency that "go", then "in" appears before "go" in the display list when the 4 key 202 and 6 key 203 on a conventional cellular phone keyboard are selected in that order.

The invention provides for reordering of the linguistics model order based on the user's usage of the system.

Referring again to FIG. 1, if more than one word shares the same key sequence, the most commonly used word is presented as a first choice in the displayed list. If the user does not want that word, but wants another word that is associated with the key sequence, then the user has the ability to scroll through the displayed list of words 105 by pressing the 0 or NEXT key, or scroll up or down keys, if present. Once the user has found the desired word, the user activates a select key, or space key 112, and the system enters the desired word into the user's text message 103 at the insertion point 104.

A preferred embodiment of the invention tracks the user's word selections. Once a word has been selected as a result of a NEXT key selection, a frequency value is applied to the selected word and the word ordered first by the linguistics model in the LDB for that key sequence. The frequency values applied to the word ordered first by the linguistics model and the word that has been selected as a result of a NEXT key (the nexted word) are dependent upon a number of factors. An example factor includes the commonality of usage of the nexted word relative to the first ordered word.

The first time that a word is nexted by the user, the frequency value of the nexted word is typically lower than the frequency value of the first ordered word in the displayed list. The next time the nexted word is nexted to again, the frequency value of the nexted word is increased relative to the frequency value of the first ordered word. The frequency values are adjusted every time a word is selected.

Another embodiment of the invention looks at the position of the nexted word in the displayed list. If the nexted word is positioned after the second word in the displayed list, then the nexted word is promoted to the second word position. This increases the nexted word's frequency to the second word's frequency or a frequency above the second word's frequency, but below the first word's frequency. Collisions will be discussed later in the text.

At some point upon nexting to the same word over and over again, the frequency value of the nexted word will become greater than the frequency value of the first displayed word. Thus, subsequent user entries of the key sequence for the nexted word and the first ordered word will result in displaying the nexted word before the word ordered first by the linguistics model.

In one embodiment of the invention, a word's frequency becomes greater than the first ordered word or another word with a higher frequency, when that word has been selected to three (or a predetermined number) more times than the first ordered word.

In another embodiment of the invention, words and their order are stored in a linguistics database and the frequency values determined as a result of nexting are stored in a separate database (a reorder database). The order identified by the frequency values in the reorder database takes priority over the order of words in the linguistics database. When frequency values are stored in the linguistic database, the frequencies in the linguistic database provide initial values for the frequencies in the reorder database.

In yet another embodiment of the invention, if no frequency values are stored in the linguistic database, the order of the words in the linguistic database are used to synthesize initial values for the frequencies in the reorder database.

Figure 3:
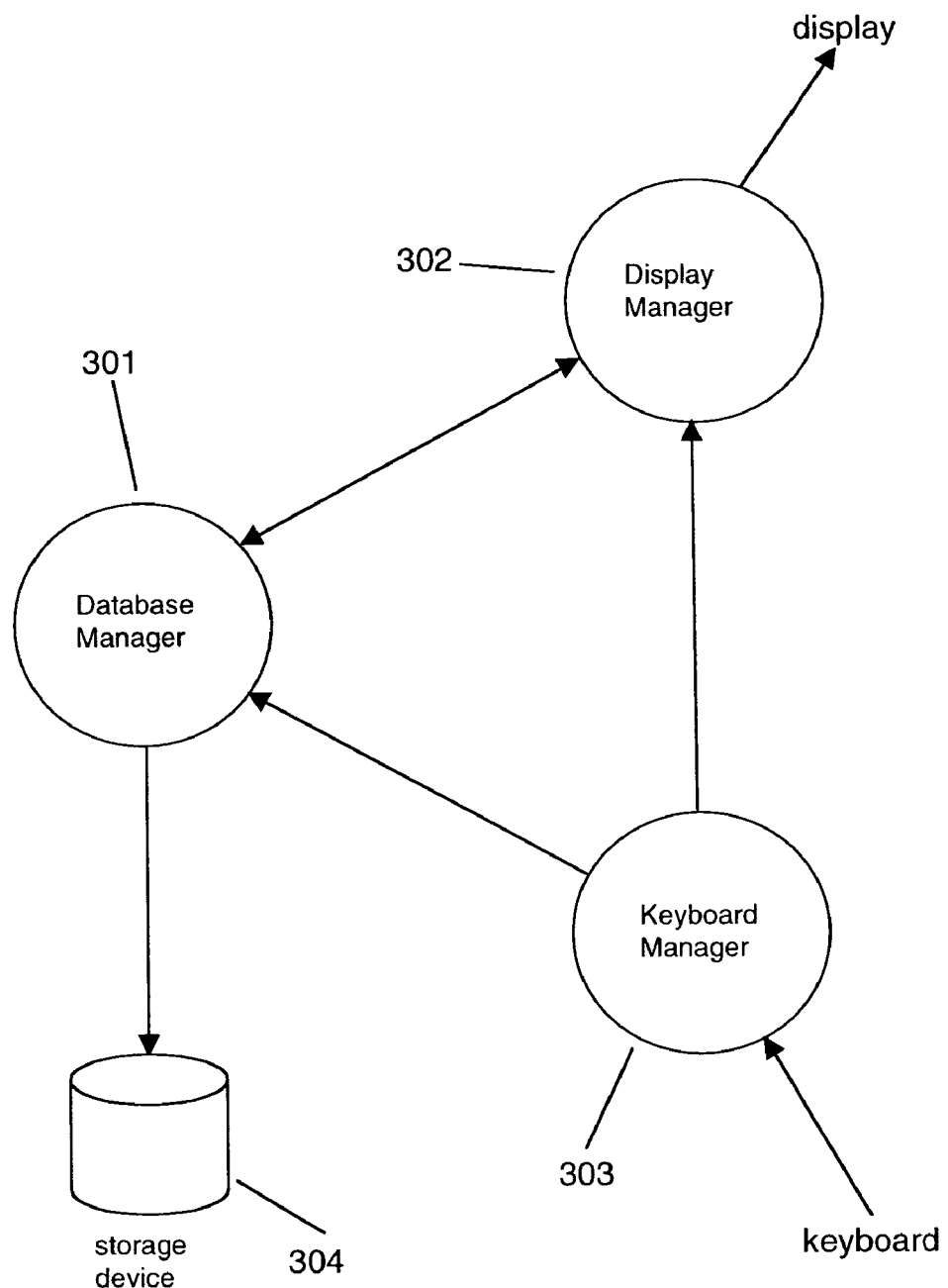
FIG. 3 is a block schematic diagram of an task viewpoint of the invention according to the invention.

With respect to FIG. 3, a subsection of the invention's text processor is shown. The Keyboard Manager 303 monitors the user's key presses. Each key press is sent to the Database Manager 301. The Database Manager 301 gathers each key press and performs predictive word processing.

The Database Manager 301 accesses the linguistic database on the host device's storage device 304 and forms a predictive word list by extracting the first n number of words form the linguistic database that match the keys pressed. The value n is dependent upon the length of list preferred by the manufacturer or user. If the list is too long, then the number of keystrokes that it takes to scroll through the list would be much greater than the total amount of key presses required to type in a complete word. The Database Manager 301 passes the list of words to the Display Manager 302. The Display Manager 302 displays the list of words to the user.

Each time a scroll key or select is pressed, the Keyboard Manager 303 notifies the Display Manager 302. The Display Manager 302 highlights the proper word in the display list using the scroll key presses. When the user presses a select key, the Display Manager 302 inserts the selected word into the user's text entry field and notifies the Database Manager 301 which word was selected.

The Database Manager 301 adjusts the frequency record for the selected word if the word is being tracked. The frequency is set by the individual user's word usage patterns. The invention does not track every word that is used. Some words do not have collisions and do not need a frequency count. The invention orders collisions that occur from equal frequency values relative to each other. The approach typically reduces the amount of memory required to store the frequency data to ⅟₇ of what is typically needed.

The Database Manager 301 must limit the frequencies for the tracked words because, otherwise, the counts might exceed the storage capacity of a register on the device. The system must adjust to a user's change in usage. The invention's aging algorithm goes through the recorded frequencies and discounts older usage frequencies. Older usages do not reflect the user's current habits and therefore count for less.

This section details the processes of learning the user's usage patterns and generating the displayed selection list that will resemble the user usage patterns.

Figure 4:
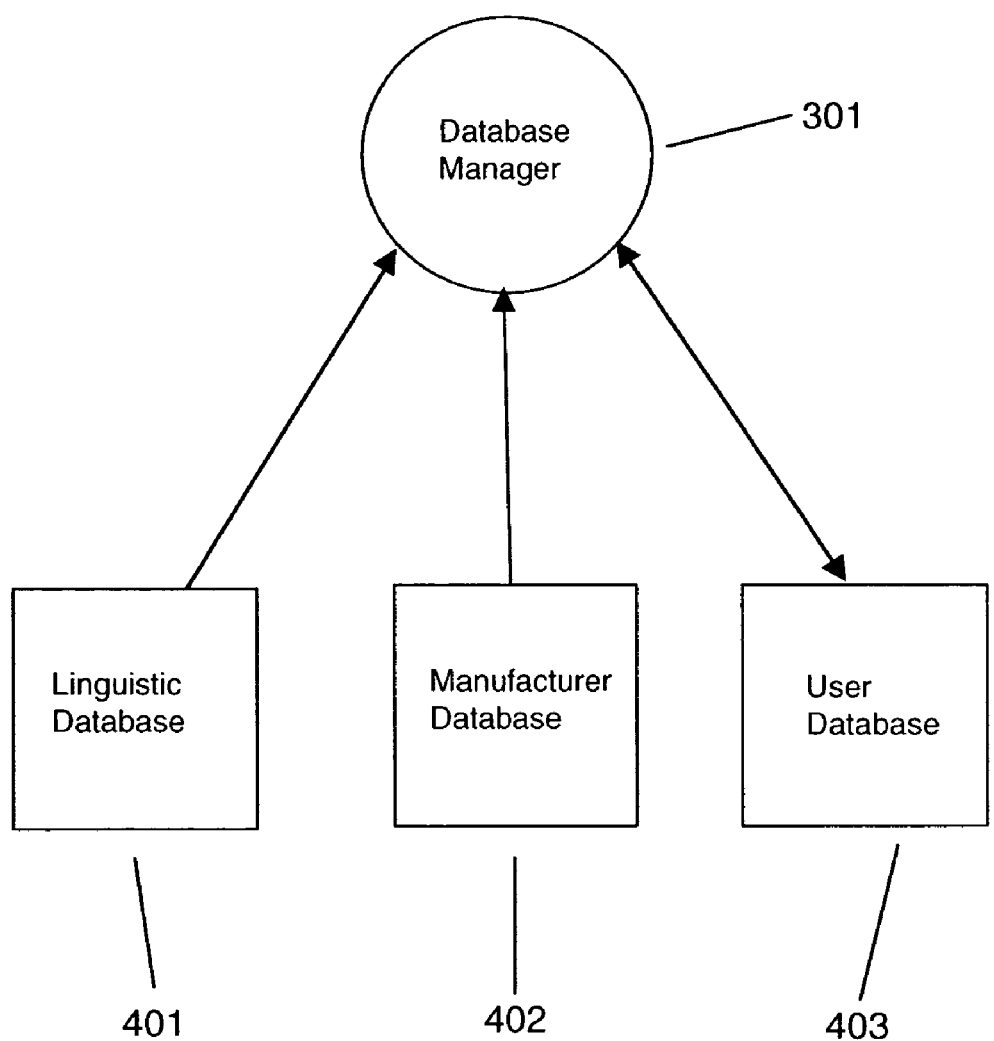
FIG. 4 is a block schematic diagram of a linguistic, manufacturer, and user database components according to the invention.

Referring to FIG. 4, a preferred embodiment of the invention's database implementation contains a Linguistic Database (LDB) 401, a Manufacturer Database (MDB) 402, and a User Database (UDB) 403. The Linguistic Database 401 is a fixed pre-compiled database containing words ordered by their frequency of use as measured by a linguistic model.

The Manufacturer Database 402 is a custom database provided by the OEM. The Manufacturer Database 402 is optional and is provided when an OEM has needs for an additional custom database beyond what is supplied in the Linguistic Database 401.

Figure 5:
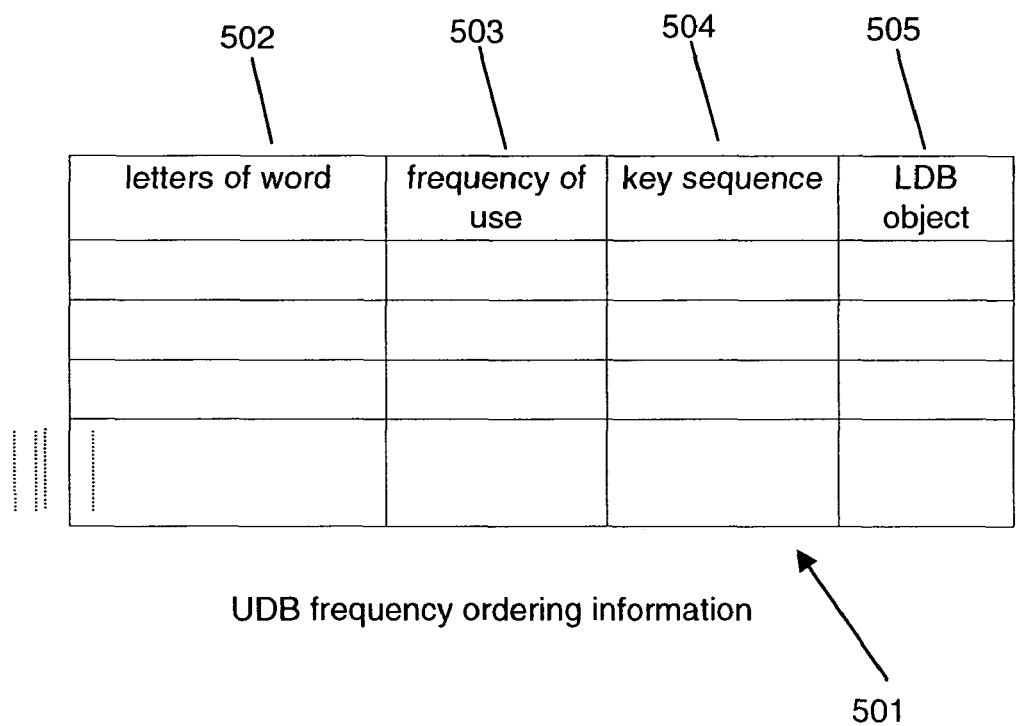
FIG. 5 is a schematic diagram of frequency information stored in a user database according to the invention.

The User Database 403 contains user defined words and a reordering database (RDB) which is a region of the User Database 403 that tracks the words that the user selects and their frequencies. FIG. 5 shows an exemplary depiction of some of the information 501 contained in the User Database 403 to track user word usage. The information lists all of the letters of each word 502, the frequency of use for the word 503, the input key sequence for the word 504, and the object number in the LDB 505 for words that are contained in the Linguistic Database 401.

The following terms are used in the text below:

UDB Reorder Word—An LDB word that was added to the RDB via word selection.

Active Word—A UDB Reorder Word that has an LDB field matching the current LDB. The concept of an active word is important when discussing the aging and garbage collection algorithms below.

Last Deletion Cut-Off Frequency—This is the frequency of the last UDB Reorder word deleted from the RDB by the garbage collection algorithm.

Reorder Words—Reorder Words are words whose frequencies are greater than or equal to the last deletion cut-off-frequencies. These words will be first on the selection display list and they include both UDB Added and UDB Reorder words.

UDB Added Words—UDB Added Word and UDB word have the same meaning; they refer to a word that has been added to the UDB by the user, either explicitly or by the system detecting a novel word constructed by the user.

Reordering Database (RDB)—The portion of the UDB where UDB Reorder Words are stored. The RDB resides within the same memory or storage space of the UDB.

First-Word and Non First-Word—Both first-word and non first-word are LDB words. Relative to the LDB, the first-word is the first displayed LDB word and the non first-word is not.

The invention's Database Manager 301 learns a user's usage patterns by keeping track of the frequencies or usage counts of each of the UDB Added and UDB Reorder words. The usage counts (frequencies) of each word are updated and set according to the word's usage patterns. The usage counts are used to determine the relative position of a word in the displayed selection list, for garbage collection, and for aging.

The first step of keeping track of the usage pattern of an LDB word is by adding it to the RDB. This adding process is kicked in when a word is accepted. The key events for accepting a word are described below. Once an LDB word is added to the RDB it is called a UDB Reorder word. The rules for adding words to the RDB are described in Table 1 where the columns refer to the type of the first object in the selection list and the rows refer to the currently selected object type. The numbers in the table refers to the adding rules, below.

TABLE 1

Adding Rules

|  | UDB Add Word | LDB Word | MDB Word |
| --- | --- | --- | --- |
| UDB Add Word | Rule_0 | Rule_1 | Rule_0 |
| LDB Word | Rule_3 | Rule_2 | Rule_3 |
| MDB Word | Rule_0 | Rule_0 | Rule_0 |

Based on the current selected object type and the object type of the first item in the displayed selection list, the table indicates the following rules:

Rule_0 This is the case where the first object in the list is either a UDB Add word or a MDB word and the selected object is either the UDB Add word or a MDB word. In this case, neither the selected object nor the first object in the displayed selection list will be added to the RDB.

Rule__1 In this case, the first object in the selection list is a LDB first-word and the selected object is a UDB Add word, the invention adds the LDB first-word (the first object in the displayed selection list) to the RDB.

Rule__2 This applies when the first object in the displayed selection list is a LDB first-word and the selected object is a LDB non-first word. Both words are added to the RDB.

Rule__3 When the selected object is a LDB word (either a LDB first or non-first word) and the first object in the displayed selection list is either a UDB Add or MDB word, then the selected LDB word is added to the RDB.

When an active word is accepted, the word is either added or not added to the RDB based on the adding rules. If the word is already in the RDB/UDB its frequency is bumped. The events for accepting a word are described as follows.

When the context for building a word list is changed by either switching to a new language, by registering or un-registering the MDB, or by terminating the Database Manager.

When a right arrow key is pressed.

When a space key is pressed. Subsequent pressing of the space key right after a space or the arrow key is pressed does not have any affect since the word was already accepted.

When on the user enters punctuation or explicit characters which don't match a known word.

A UDB Add word is added to the UDB when it is accepted as described above. The initial frequency is set to three use counts higher (this can be set to any value that sets it apart from the first-word) than the first-word. The UDB Added word frequency is bumped when the word is used.

The invention uses the "non-aggressive" learning principle, where a single usage of a non-first word should not beat the first-word to the first position in the displayed selection list, by employing a gradual learning of the user's usage patterns to promote word ordering. The "non-aggressive" principle can be achieved by carefully updating and setting the frequencies.

When adding a first-word and a non-first word to the RDB, the frequencies for the first-word is set so that it would take three (or a predetermined number) un-countered uses of the non first-word for the first-word to lose its first place position in the displayed selection list. The first time the user presses a space key to select a non-first word it is considered one use. For example, if both words were just added, then two more uses of the non first-word will move it to the first place in the displayed selection list.

All non-first words start with the same initial frequencies. Their frequencies will be increased or decreased by how often they are used. Frequencies are decreased during the Aging process.

If selecting a first-word from the displayed selection list and it is already in the RDB, its frequency will be bumped.

If attempting to add a first-word to the RDB (when selecting a non-first word) and the first-word is already in the RDB, its frequency will not increase. It is assumed that it is already in the correct position.

The initial frequencies of a UDB Add Word are two use counts higher than the first-word. This delta value can be adjusted for different implementations.

At some time intervals, all of the UDB Add and UDB Reorder words will be aged. Aging means reducing their frequencies by some factor. How often the aging is performed is based on the unit of time interval used, the unit of time interval is maintained by the Database Manager. Since there is no concept of time in the database, the invention heuristically computes the time intervals by maintaining an update count. This update count is incremented by one every time a space key is pressed to select a word. When the update count has reached a certain value, the Aging process is kicked in. This is performed as follows:

When the update count reaches its maximum (1000 in this case), the aging process kicks-in. Statistically, 1000 applies to a fast T9® user that can type 20 wpm using T9®, entering text with a sustained effort for 50 minutes. It is also about 50 messages of 20 words (~120 characters).

The frequencies of all words are reduced by a ($31/32$) factor for aging. One skilled in the art will readily appreciate that any aging factor can be used to achieve the desired decay rate. For example, if the frequency of the non-first word was 54, then it will be reduced to 52 ($54 \times (31/32)$).

For garbage collection, the "easy come, easy go" principle is used to first delete UDB Reorder Words and then UDB Add Words from the RDB and UDB storage space. Reorder words are preferred for deletion by a factor of 2. Thus, before a UDB Add word with X frequency is deleted, the invention first removes all Reorder words with frequencies less than or equal to 2*X. The garbage collection algorithm is described as follows:

1. Remove all UDB Add Words that have been marked as deleted.
2. If the amount of space free space after step 1 is greater than or equal to $1/8$ of the total UDB data space, then garbage collection is done.
3. Otherwise, increment the Last Deletion Cut-Off Frequency and delete all UDB Reorder Words with this frequency and all UDB Add Words with half this frequency. This process continues until $1/8$ of UDB space is free.

One skilled in the art will readily appreciate that the threshold value of $1/8$ can be adjusted to reach a desired amount of UDB free space.

The new displayed selection list is composed of first (visually from top) Reorder Words, UDB, LDB, and MDB words (depending on the MDB fence). The MDB fence is used to set the maximum number of LDB words that can appear before the list of MDB words. This is to ensure that the OEM will have its words displayed. The number of Reorder Words in the displayed selection list is determined by the last deletion cut-off frequency or the non first-word initial frequencies, which ever is smaller—call this number RDB Count. All UDB Add and UDB Reorder Words whose frequencies are greater than or equal to RDB Count are Reorder Words and will appear first in the displayed selection list. The order of their appearance in the displayed selection list is hierarchically described as follows:

1. All Reorder Words whose frequencies are above the cut-off frequencies.
2. UDB terminal words.
3. LDB words up to the MDB fence.
4. MDB terminal words.
5. UDB stems.
6. MDB stems.

Tie Breaker refers to Reorder Words with the same frequencies when competing for the first 5 (number of sorted items) positions in the displayed selection list. The following rules are applied to break the tie:

1. If two UDB Add Words are tied, the last word added to the UDB wins.

2. If UDB Add and UDB Reorder Words are tied, the UDB Add Word wins.
3. If two UDB Reorder Words are tied, the word with the smaller LDB object number wins.

Each UDB Reorder Word is stored as a key sequence along with its LDB object number. With that information and the knowledge of which LDB they came from, the word can be re-constructed. This technique uses less memory to store a RDB word. Using only one nibble for a character rather one or two bytes per character.

One UDB Reorder Word should cost on average of eight bytes—two bytes frequency, one byte length, one byte LDB object number, one byte Language ID, plus three bytes for six characters word [average word length]. 4 Kbytes of RDB space is capable of holding around 512 UDB Reorder Words, 3 Kbytes would capable of holding around 384 words, 2 Kbytes would hold around 256 words, and 1 Kbytes holds around 128 words.

The user can to turn on and off the RDB. The behaviors are described as follows:

Turn on the RDB feature if it is not already turned on.
Turning off the RDB will have two effects:
The displayed selection list falls to its original ordering.
Any UDB Reorder words in the RDB will remain there until garbage collection.

One skilled in the art will readily appreciate that, although the term word has been used throughout the text above, the invention will equally apply to other linguistic input units such as a syllable or a phrase. For example, single syllables are input in Chinese and whole phrases are input in Japanese.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer-implemented process for reordering items in a database to be retrieved for display to a user, comprising the steps of:
storing a plurality of words in a linguistic database (LDB), said plurality of words ordered in said LDB according to a predefined linguistics frequency of use model;
accepting with a processor user input from a keyboard, said user input comprising at least one keypress;
retrieving any words from said LDB that matches at least one letter corresponding to said at least one keypress;
displaying a list of said retrieved words as ordered in said LDB;
accepting a user-defined word as input by said user;
storing said user-defined word in a user database (UDB);
assigning a frequency count to said user-defined word;
storing said frequency count for said user-defined word in said UDB;
enabling said user to select a word from said displayed list;
assigning a frequency count to every selected word in a non first order position in said displayed list and a frequency count to a first order word, if a non first order word is selected, said frequency count for said non first order selected word being different than said frequency count for said first order non selected word;
storing said frequency count of each word in association with each word in said UDB;
accepting a subsequent user input from a keyboard, said user input comprising at least one keypress;
retrieving any words from said LDB and any user-defined words from said UDB that match at least one letter corresponding to said at least one keypress;
if more than one word from any of said LDB and said UDB is retrieved and at least one retrieved word is associated with a frequency count, dynamically reordering for display said retrieved words as a function of said predefined linguistics frequency of use model and each frequency count associated with any of said retrieved words;
displaying a list of said reordered matching words if more than one word matches said user's subsequent input; and
updating a frequency count associated with a word each time a non first order word is selected from a displayed list of matching words.

2. The process of claim 1, wherein if a non first ordered word is selected by said user a predetermined number of times then said non first ordered word is displayed in a first ordered position in said list of reordered matching words.

3. The process of claim 1, wherein all non first ordered words that are assigned said frequency count are initially assigned equal frequency counts.

4. The process of claim 1, wherein said word's frequency count is increased each time said user selects said word.

5. The process of claim 1, wherein if said user selects said word from said list of retrieved words or said list of reordered words that is below a second ordered position, then said selected word is assigned said frequency count that places said word in said second ordered position in said list.

6. The process of claim 1, further comprising the step of:
periodically checking free space in said UDB and, if said free space is less than a predetermined amount, then removing from said UDB said words that have said frequency counts below a predetermined threshold.

7. The process of claim 6, wherein said removing step removes said user-defined words having said frequency counts below said predetermined threshold after removing other words having said frequency counts below said predetermined threshold.

8. The process of claim 1, further comprising the step of:
resolving frequency collisions when two words in said list of reordered words are associated with equal frequency counts by ordering said word that was most recently selected first.

9. The process of claim 1, further comprising the step of:
resolving frequency collisions when two words in said list of reordered words are associated with equal frequency counts by ordering said word having a higher initial ordering in said LDB first.

10. The process of claim 1, further comprising the step of:
resolving frequency collisions in said list of reordered words when a user-defined word and a word from said LDB have equal reordering frequency counts by ordering said user-defined word first.

11. The process of claim 1 wherein when said word from said LDB is selected for a first time, said step of assigning said frequency count generates said frequency count from said word's position in said LDB as a function of said predefined linguistics frequency of use model.

12. The process of claim 11, wherein said user-defined words are initially assigned equal frequency counts during said assigning step.

13. A computer-implemented process for reordering items in a database to be retrieved for display to a user, comprising the steps of:
storing a plurality of words in a linguistic database (LDB), said plurality of words ordered in said LDB according to a predefined linguistics frequency of use model;

accepting with a processor user input from a keyboard, said
user input comprising at least one keypress;
retrieving any words from said LDB that match at least one
letter corresponding to said at least one keypress;
displaying a list of said retrieved words as ordered in said
LDB;
accepting a user-defined word as input by said user;
storing said user-defined word in a user database (UDB);
assigning a frequency count to said user-defined word;
storing said frequency count for said user-defined word in
said UDB;
enabling said user to select a word from said displayed list;
assigning a frequency count to every selected word in a non
first order position in said displayed list and a frequency
count to a first order word, if a non first order word is
selected, said frequency count for said non first order
selected word being different than said frequency count,
said frequency count for said first order non selected
word;
storing said frequency count of each word in association
with each word in said UDB;
storing a frequency count for a first order word from said
displayed list if a non first order word is selected from
said displayed list, said frequency count for said non
selected first order word being lower than said frequency
count for said selected non first order word, said frequency count being stored in association with said first
order non selected word in said UDB
accepting a subsequent user input from a keyboard, said
user input comprising at least one keypress;
retrieving any words from said LDB and any user-defined
words from said UDB that match at least one letter
corresponding to said at least one keypress;
if more than one word from any of said LDB and said UDB
is retrieved and at least one retrieved word is associated
with a frequency count, dynamically reordering for display said retrieved words as a function of said predefined
linguistics frequency of use model and each frequency
count associated with any of said retrieved words;
displaying a list of said reordered matching words if more
than one word matches said user's subsequent input;
updating a frequency count associated with a word each
time a non first order word is selected from a displayed
list of matching words; and
periodically aging said frequency counts in said reorder
database by reducing said frequency counts by a predetermined factor.

14. A computer-implemented process for reordering items
in a database to be retrieved for display to a user, comprising
the steps of:
storing a plurality of words in a linguistic database (LDB),
said plurality of words ordered in said LDB according to
a predefined linguistics frequency of use model;
accepting with a processor user input from a keyboard, said
user input comprising at least one keypress;
retrieving any words from said LDB that matches at least
one letter corresponding to said at least one keypress;
displaying a list of said retrieved words as ordered in said
LDB;
accepting a user-defined word as input by said user;
storing said user-defined word in a user database (UDB);
assigning a frequency count to said user-defined word;
storing said frequency count for said user-defined word in
said UDB;
enabling said user to select a word from said displayed list;
assigning a frequency count to every selected word in a non
first order position in said displayed list and a frequency
count to a first order word, if a non first order word is
selected, said frequency count for said non first order
selected word being different than said frequency count
for said first order non selected word;
storing said frequency count of each word and in association with each word in said UDB;
accepting a subsequent user input from a keyboard, said
user input comprising at least one keypress;
retrieving any words from said LDB and any user-defined
words from said UDB that match at least one letter
corresponding to said at least one keypress;
if more than one word from any of said LDB and said UDB
is retrieved and at least one retrieved word is associated
with a frequency count, dynamically reordering for display said retrieved as a function of said predefined linguistics frequency of use model and each frequency
count associated with any of said retrieved words;
displaying a list of said reordered matching words if more
than one word matches said user's subsequent input;
updating a frequency count associated with a word each
time a non first order word is selected from a displayed
list of matching words; and
wherein words selected by said user that do not have a
possibility of a collision with other words are not
assigned a frequency count.

15. An apparatus for reordering items in a database to be
retrieved for display to a user, comprising:
a module for accepting user input from a keyboard, said
user input comprising at least one keypress;
a linguistic database (LDB) containing a plurality of words
ordered according to a predefined linguistic frequency
of use model;
a module for displaying to said user a list of any words in
said LDB and any user-defined words in a user database
(UDB) that match at least one letter corresponding to
said at least one keypress, said words retrieved from any
of said LDB and from said UDB;
said UDB for storing any user-defined words entered by
said user, a frequency count associated with each userdefined word, and a frequency count associated with
each word stored in said LOB that was assigned a frequency count by an assigning module;
a module for retrieving from any of said LOB and from said
UDB a list of any words that match at least one letter
corresponding to said at least one keypress of said user's
input, said words dynamically reordered for display of
said retrieved words as a function of said predefined
linguistics frequency of use model and each frequency
count associated with any of said retrieved words; and
said assigning module for assigning a frequency count to
every selected word in a non first order position in a list
of said retrieved words and assigning a frequency count
to a first order word if a word in a non first order position
is selected, said frequency count being different for said
first order word than said frequency count for said
selected non first order word, said assigning module
updating a frequency count each time a non first order
word is selected from said retrieved list.

16. The apparatus of claim 15, wherein said frequency
count is assigned to said selected word if said selected word is
in a non first order position in said list and is selected for a first
time.

17. The apparatus of claim 16, wherein if said non first
ordered word is selected by said user a predetermined number
of times then said non first ordered word is displayed in a first
ordered position in said list.

18. The apparatus of claim 16, wherein all non first ordered words that are assigned said frequency count are initially assigned equal frequency counts.

19. The apparatus of claim 15, wherein said word's frequency count is increased each time said user selects said word.

20. The apparatus of claim 15, wherein if said user selects from said list a word that is below a second ordered position then said assigning module assigns a frequency count that places said word in said second ordered position in said list.

21. The apparatus of claim 15, further comprising:
a module for periodically checking for free space in said UDB and, if said free space is less than a predetermined amount, then removing from said UDB said frequency counts and corresponding object numbers or corresponding user-defined words for words that have frequency counts below a predetermined threshold.

22. The apparatus of claim 21, wherein said removing module removes user-defined words having frequency counts below said predetermined threshold after removing other words having frequency counts below said predetermined threshold.

23. The apparatus of claim 15, further comprising:
a module for resolving frequency collisions when two words in said list have equal frequency counts by ordering said most recently selected word first.

24. The apparatus of claim 15, further comprising:
a module for resolving frequency collisions when two words in said list have equal frequency counts by ordering said word having a higher initial ordering in said LDB first.

25. The apparatus of claim 15, further comprising:
a module for resolving frequency collisions in said list when said user-defined word and said word from said LDB have equal frequency counts by ordering said user-defined word first.

26. The apparatus of claim 15 wherein said assigning module assigns said frequency count for said word from said LDB based on said predefined linguistics frequency of use model.

27. The apparatus of claim 26, wherein said user-defined words are initially assigned equal frequency counts by said assigning module.

28. An apparatus for reordering items in a database to be retrieved for display to a user, comprising:
a module for accepting user input from a keyboard, said user input comprising at least one keypress;
a linguistic database (LDB) containing a plurality of words ordered according to a predefined linguistic frequency of use model;
a module for displaying to said user a list of any words in said LDB and any user-defined words in a user database (UDB) that match at least one letter corresponding to said at least one keypress, said words retrieved from any of said LDB and from said UDB;
said UDB for storing any user-defined words entered by said user, a frequency count associated with each user-defined word, and a frequency count associated with each word stored in said LDB that was assigned a frequency count by an assigning module;
a module for retrieving from any of said LDB and from said UDB a list of any words that match at least one letter corresponding to said at least one keypress of said user's input, said words dynamically reordered for display of said retrieved words as a function of said predefined linguistics frequency of use model and each frequency count associated with any of said retrieved words;
said assigning module for assigning said a frequency count to every selected word in a non first order position in a list of said retrieved words and assigning a frequency count to a first order word if a word in a non first order position is selected, said frequency count being different for said first order word than said frequency count for said selected non first order word, said assigning module updating a frequency count each time a non first order word is selected from said retrieved list; and
a module for periodically aging said frequency counts in said reorder database by reducing said frequency counts by a predetermined factor.

29. An apparatus for reordering items in a database to be retrieved for display to a user, comprising:
a module for accepting user input from a keyboard, said user input comprising at least one keypress;
a linguistic database (LDB) containing a plurality of words ordered according to a predefined linguistic frequency of use model;
a module for displaying to said user a list of any words in said LDB and any user-defined words in a user database (UDB) that match at least one letter corresponding to said at least one keypress, said words retrieved from any of said LDB and from said UDB;
said UDB for storing any user-defined words entered by said user, a frequency count associated with each user-defined word, and a frequency count associated with each word stored in said LDB that was assigned a frequency count by an assigning module;
a module for retrieving from any of said LDB and from said UDB a list of any words that match at least one letter corresponding to said at least one keypress of said user's input, said words dynamically reordered for display of said retrieved words as a function of said predefined linguistics frequency of use model and each frequency count associated with any of said retrieved words; and
said assigning module for assigning a frequency count to every selected word in a non first order position in a list of said retrieved words and assigning a frequency count to a first order word if a word in a non first order position is selected, said frequency count being different for said first order word than said frequency count for said selected non first order word, said assigning module updating a frequency count each time a non first order word is selected from said retrieved list;
wherein said words selected by said user that do not have a possibility of a collision with other words are not assigned said frequency count.

* * * * *